United States Patent
Schaepperle

(10) Patent No.: US 8,559,378 B2
(45) Date of Patent: Oct. 15, 2013

(54) WIRELESS ACCESS SYSTEM AND TRANSMISSION METHOD

(75) Inventor: Joerg Schaepperle, Stuttgart (DE)

(73) Assignee: Alcatel Lucent, Paris (FR)

( * ) Notice: Subject to any disclaimer, the term of this patent is extended or adjusted under 35 U.S.C. 154(b) by 748 days.

(21) Appl. No.: 12/177,537

(22) Filed: Jul. 22, 2008

(65) Prior Publication Data

US 2009/0028105 A1    Jan. 29, 2009

(30) Foreign Application Priority Data

Jul. 24, 2007 (EP) .................................. 07290924
Oct. 17, 2007 (EP) .................................. 07291269

(51) Int. Cl.
- *H04W 4/00* (2009.01)
- *H04W 28/04* (2009.01)
- *H04W 72/04* (2009.01)

(52) U.S. Cl.
CPC ............. *H04W 28/04* (2013.01); *H04W 72/04* (2013.01)
USPC ............................ 370/329; 370/208; 455/436

(58) Field of Classification Search
USPC ................................... 370/208, 329; 455/436
See application file for complete search history.

(56) References Cited

U.S. PATENT DOCUMENTS

| | | | |
|---|---|---|---|
| 2002/0098860 A1* | 7/2002 | Pecen et al. | 455/522 |
| 2004/0166869 A1* | 8/2004 | Laroia et al. | 455/450 |
| 2006/0232447 A1* | 10/2006 | Walker et al. | 341/50 |
| 2007/0025283 A1 | 2/2007 | Koslov | |
| 2007/0250638 A1* | 10/2007 | Kiran et al. | 709/236 |
| 2008/0089278 A1* | 4/2008 | Chang et al. | 370/329 |

FOREIGN PATENT DOCUMENTS

| | | |
|---|---|---|
| WO | 2005055444 A2 | 6/2005 |
| WO | 2006096678 A1 | 9/2006 |
| WO | 2006133932 A1 | 12/2006 |

* cited by examiner

*Primary Examiner* — Ricky Ngo
*Assistant Examiner* — Richard K Chang
(74) *Attorney, Agent, or Firm* — Fay Sharpe LLP

(57) ABSTRACT

The present invention relates to the field of wireless access systems and more particularly to a broadband wireless access system and a transmission method for such system. At least two data streams (2, 3, 4) are simultaneously transmitted in a multi-user channel (1) having a location dependent capacity. The data streams (2, 3, 4) are transmitted on the same radio resources. Preferably, the data streams are combined in a transmitter and separated in a receiver using different modulation and/or coding for the data streams.

18 Claims, 4 Drawing Sheets

WIRELESS ACCESS SYSTEM AND TRANSMISSION METHOD

FIELD OF THE INVENTION

The present invention relates to the field of wireless access systems and more particularly to a broadband wireless access system and a transmission method for such system.

BACKGROUND AND PRIOR ART

Cellular wireless data access systems typically consist of a set of base stations each with a certain number of sectors and each sector having a transmitter and a receiver with one or multiple antenna elements. Mobile terminals are typically assigned to one or more base stations by wireless connections to one sector of each of these base stations. Base stations and sectors are related to geographical areas where the distance to the antennas belonging to the sectors is low, the angular range supported by the antenna corresponds to that area and the channel quality between users located in that area and the base station including interference from other terminals/base station is sufficient to establish a wireless connection.

Connections between a base station and mobile terminals that are assigned to the same sector of that base station can typically have significantly different channel qualities and very different path losses depending on their distance to the base station, which typically varies from a few meters up to a few kilometers. This means that a signal transmitted by the base station at a certain power level can have significantly different power levels at the receivers of different terminals due to different path losses, and signals transmitted by different users in different distances to the base station that arrive at the base station with the same power level must have been transmitted with different power levels at the terminals.

The channel between the base station on the one side and a variety of users in different distances and with different channel properties on the other side is in the following called multi-user channel. In downlink it is a broadcast channel with one input fed by a base station transmitter and many outputs listened to by mobile terminal receivers. In uplink it is a multiple-access channel with many inputs fed by mobile terminal transmitters and one output to the base station receiver. The channel between the base station and different users in different distances can be regarded as a series connection of channel sections with different channel qualities measured e.g. in form of signal-to-noise-and-interference ratios (SINRs) or fading channel characteristics. In such a model the interface between the sections is a spatially distributed signal and the signal seen by a terminal located at said interface is a scalar or vector signal derived from said spatial signal e.g. by antennas.

In current broadband wireless access systems, like for example IEEE 802.16, also known as WiMAX, using OFDM/OFDMA, each single radio resource (frequency sub-band or time slot) is used in one point-to-point transmission. Multiplexing and multiple access is done using different at least approximately orthogonal radio resources. For transmitting broadcast or multicast information, like for example maps required for the allocation of radio resources to terminals and for user data to or from far terminals with high path loss, a robust modulation and coding method with low spectral efficiency is used.

Thus, in known systems a multi-user channel is used in time and frequency multiplex, which is not optimal with respect to throughput in relation to theoretical capacity. In fact, capacity is wasted and the known transmission methods do by far not achieve the information theoretical sum capacity of the multi-user channel in a cellular wireless access system. This results in poor spectral efficiency and low average throughput.

It is an object of the present invention to improve the usage of a multi-user channel and thus to enhance the throughput and spectral efficiency in wireless access systems having a strongly location dependent channel quality.

SUMMARY OF THE INVENTION

According to the present invention at least two data streams are transmitted on the same radio resources. Preferably, the data streams are combined in a transmitter and separated in a receiver using different modulation, power levels and/or coding for the data streams.

As will be explained below, appropriate techniques for transmission of more than one data stream on the same radio resource are, for example, the use of hierarchical or layered modulation and coding in the physical and MAC layers. According to a preferred embodiment of the present invention hierarchical modulation and coding in the physical layer is used for improved usage of a multi-user channel.

In accordance with information theory two or more data streams are transported on the same radio resources, e.g. subchannels/subcarriers in OFDM, in the same time slot to or from terminals at different locations. This is supported by the fact that the radio channels can be very different in path loss and the signals related to the different data streams can have significantly different power levels.

In the physical and link layers of wireless access systems there are different kinds of downlink information to be transmitted. Among these are broadcast information, which should be received by all users in the respective sector, multicast information that should be received by a subset of these users and unicast information that is destined for only one user. For broadcast and multicast information the modulation and coding scheme in current systems is chosen in such a way that it is robust enough for the channel with the lowest quality (e.g. in SINR). This means that the channel between the base station and a near user is not fully used for that information. That is, the data rate transported in that part of the multi-user channel can be significantly smaller than the channel capacity. A similar situation occurs in the uplink. A far terminal sends information to the base station at a high power level. Due to high path loss the corresponding signal arrives at the base station at a low power level. The supported rate of that signal is much smaller than the channel capacity between a near user and the base station. Therefore, in current systems the channel section between the near user and the base station is not fully used.

According to the present invention, while transmitting broadcast information (e.g. map information) or while transmitting information to a far terminal with high path loss (downlink), additional information is transmitted to a near terminal at low power level. For the detection a multi-user receiver may be used. Similarly, additional information can be received from a near terminal at a higher power level, while receiving information from a far terminal at low power level (uplink). Thus, system capacity is increased significantly. Despite of some additional demodulation and decoding effort in some cases, there are no higher requirements to the hardware like higher bandwidth or higher resolution or larger number of antennas to increase throughput. To significantly enhance throughput in cellular wireless access systems the present invention preferably uses hierarchical modulation and coding or similar methods at the physical layer.

Thus, according to the present invention in all sections of the multi-user channel the channel capacity is approached whereby the multi-user channel is better used in comparison with current systems. This can be achieved in downlink as well as in uplink. In downlink, when information is transported from the base station to a far user using a robust modulation and coding scheme with low data rate, at the same time additional independent data can be transmitted from the base station to a near user using the same radio resources (frequency band and time slot) but for example different power levels or different levels in hierarchical coding or modulation. This means using hierarchical coding and modulation at the physical layer.

Even though the method of the present invention requires a slightly increased computational complexity and transmit power for near users to achieve the additional system throughput, far users have no additional computational complexity and require no higher transmit power and near users require no higher transmit power than far users. That is, there is an improved fairness with respect to achievable data rates between near and far users and the difference between transmit powers of near and far users is reduced. In particular, there are no additional requirements to analog hardware compared with conventional systems. Furthermore, the usage of the multi-user channel is improved by means of the present invention and thus the throughput in cellular broadband wireless data access systems is enhanced.

According to a preferred embodiment of the present invention two or more streams of data with broadcast and unicast information (downlink) are modulated, coded and combined in such a way, that a far user can demodulate and decode the part of information that is relevant for him and the near user can demodulate the complete information and select the part that is relevant for him. Furthermore, broadcast information, like for example maps describing the allocation of radio resources to terminals and users, can be simultaneously delivered to different users with different radio channel qualities in the same quality of service, i.e. without bit errors. And independent data streams, i.e. data streams from independent sources, can be simultaneously delivered to users at different locations.

According to a further preferred embodiment of the present invention in uplink two or more terminals transmit on the same radio resources at the same time, the signals are combined in the air and the base station can separate, demodulate and decode all the streams of information as long as coding, modulation and power level are appropriate. Additionally, in the uplink, i.e. from the terminals to the base station, data from independent sources at different locations is transported to the location of the base station using the common radio channel.

Furthermore, in uplink, while a far terminal sends information with high power to the base station and this arrives at the base station receiver due to a high path loss at a low power level, a second terminal that is near the base station sends additional information that, when arriving at the base station receiver, occupies also the higher power levels. Using appropriate modulation and coding, the two streams of information can be separated by the base station receiver. The only limitation in uplink is that the combined signal containing the different data streams must be a sum of the received signals that are the channel responses of signals transmitted at different locations, since they are added by superposition of electromagnetic waves in the air. For example, this can be done by using hierarchical modulation.

The method of the present invention is used to increase the capacity of a broadband wireless access system, for example in WiMAX systems. In particular, it is to be noted that the situation in wireless data access networks is different from video broadcasting, where hierarchical modulation sometimes is used (e.g. DVB-T). In known wireless digital video broadcasting a single video stream can be delivered in various qualities of service to different destinations. That is, different coding levels, corresponding e.g. to different resolutions of a picture, related to the same information source are transported over different logical channels in the physical layer with different channel qualities over a common radio channel to different users using e.g. hierarchical modulation. However, contrary thereto according to the present invention two or more data streams are transported on the same radio resources in a wireless access system.

Pilot symbols dedicated to single data streams may be used to measure channel quality between a base station and a single terminal and to support separation of different data streams.

The present invention also comprises a method to assign radio resources to groups of terminals and to define signal parameters like for example the transmit power. The terminals, which belong to one group of terminals and which share the same radio resources, and the signal parameters are defined depending on a distance of the terminals to a base station and/or channel characteristics of the channels between the base station and said terminals. The channel characteristics are based on either instantaneous or average characteristics. That is, the channel characteristics may comprise the mean path loss and/or the angular characteristics (e.g. mean direction of arrival) of the channels between the base station and the terminals. A preferred embodiment assigns the same radio resource to terminals that differ at least in either the mean path loss or the angular characteristics of their channels. The present invention comprises also a system for measuring channel characteristics of channels between a base station and at least two mobile terminals, which is able to carry out the above method. Such system may be installed into a base station of a wireless communication network.

These and other aspects of the invention will be apparent from and elucidated with reference to the embodiments thereafter. It should be noted that the use of reference signs shall not be construed as limiting the scope of the invention.

DETAILED DESCRIPTION OF THE DRAWINGS

Figure 1:
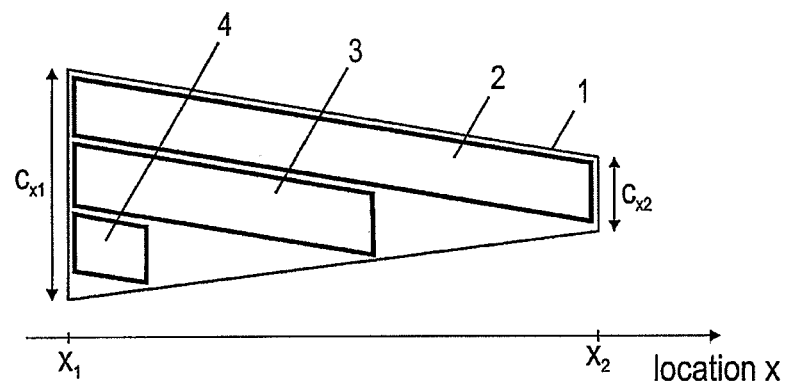
FIG. 1 shows a distributed multi-user channel in a wireless access system according to the present invention.

FIG. 1 shows a distributed multi-user channel 1 corresponding to one common set of radio resources. The channel extends from a base station to a farthest terminal, the base station being located at $x_1$ and the farthest terminal being located at $x_2$. Furthermore, the channel 1 includes subsections from the base station to several users. As can be seen from FIG. 1, the channel capacity $c_{x1}$ at the location $x_1$ of the base station differs from the channel capacity $c_{x2}$ at the location $x_2$ of the farthest terminal. The capacity of a channel section depends on the signal-to-interference-and-noise ratio (SINR) and this depends on the location x. Capacity and SINR typically decrease with increasing distance to the base station, since due to the path loss which typically increases with the distance the received signal power decreases with the distance. It should be noted that in the following the terms farthest and nearest terminal stand for different channel qualities. The noise power added in the receiver is independent of the distance between the base station and the terminals.

Additionally, the interference in a cellular system is typically stronger at higher distances to the base station, because there the distance to the nearest interferer is typically smaller. The location dependent capacity is indicated by the width of the trapezoid representing the channel 1 in FIG. 1. The information rate of a first data stream 2 that can be transmitted from the base station to a corresponding first terminal is limited by the power level arriving at the corresponding location, the noise added in said terminal and the interference power seen by said terminal. The unused channel capacity between the base station and a second terminal is used to transport additional information by means of a second data stream 3 from the base station to said second terminal in medium distance when using appropriate coding, modulation and signal combining. Accordingly, the still unused channel capacity between the base station and a third terminal at low distance can be used for a third data stream 4. Since the first data stream 2 in downlink can be received by all three terminals it can also be used for broadcast information. The second data stream 3 can be used for multicast information in downlink.

By means of FIG. 1 not only the above downlink situation but also an uplink situation can be described. Here the signals containing more than one data stream are sums of the signals containing one data stream since the signals containing one data stream are sent by different terminals and added in the air. In the uplink situation, at a given location, the signals sent by terminals with low distance to the base station have typically a higher power level than signals that have been sent by terminals that have a higher distance to the base station. As opposed to conventional wireless access systems, the different data streams are not modulated on mutual orthogonal or nearly orthogonal radio resources but on the same radio resources. They can be separated using appropriate modulation and coding typically making use of the different power levels resulting from the spatial distribution of the terminals relative to the base station and the different transmit power levels applied by the base station and/or the terminals.

Figure 2:
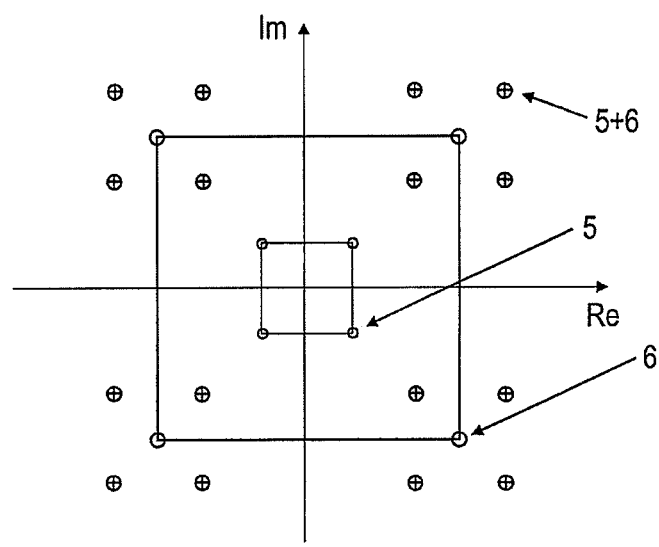
FIG. 2 shows two QPSK constellations with different mean signal powers in the complex domain and the hierarchical constellation resulting from superposition of the two constellations.

FIG. 2 shows two QPSK constellations 5, 6 with different mean signal powers in the complex domain and the hierarchical constellation 5+6 resulting from superposition of the two constellations. This is an example for hierarchical modulation. In uplink, the constellation in FIG. 2 can result from the superposition of signals transmitted from different terminals using appropriate transmit powers coordinated typically by the base station. The transmit power levels have to be chosen in such a way, that the desired constellation results at the base station receiver after the signals from the different terminals having experienced different path losses. In downlink, the constellation of FIG. 2 can be generated by the base station by adding the signals with appropriate weights.

An alternative method is to use mappings of bit patterns to constellation points such that different bits can have different sensitivity to noise. That is, they have different bit error probability for the same noise power level. In this case, information to be decoded by terminals with low SINR can be mapped on bits that are insensitive to noise and information to be decoded by terminals with high SINR can be mapped to bits that are sensitive to noise. This results in different layers of modulation/coding with different robustness against noise and other channel distortions.

In the following, the methods and apparatuses for processing the signals in different cases are described by block diagrams. For simplicity, the diagrams are shown for two data streams only, but they can be extended to an arbitrary number of data streams.

Figure 3:
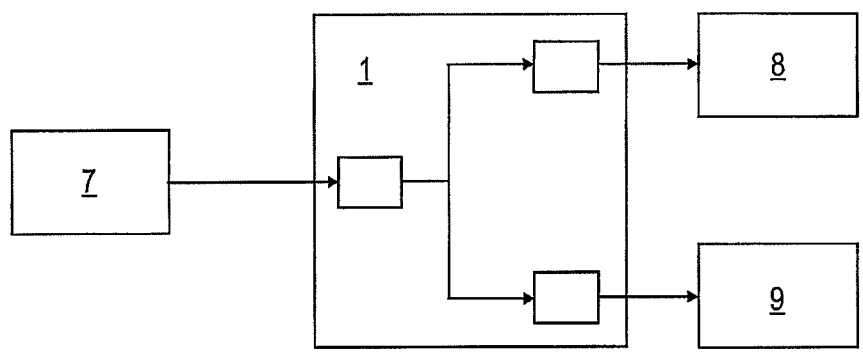
FIG. 3 shows a block diagram illustrating a downlink situation according to the present invention.

FIG. 3 shows a block diagram illustrating a downlink situation. The base station 7 sends broadcast and/or unicast information to a first terminal 8 and a second terminal 9 on the same radio resources but different levels of hierarchical coding/modulation. The distributed broadcast channel 1 corresponds to one common set of radio resources. In other words, radio resources are shared to transmit broadcast or multicast information from the base station 7 to more than one terminal and one or more streams of unicast information each of them to one terminal in the downlink.

Figure 4:
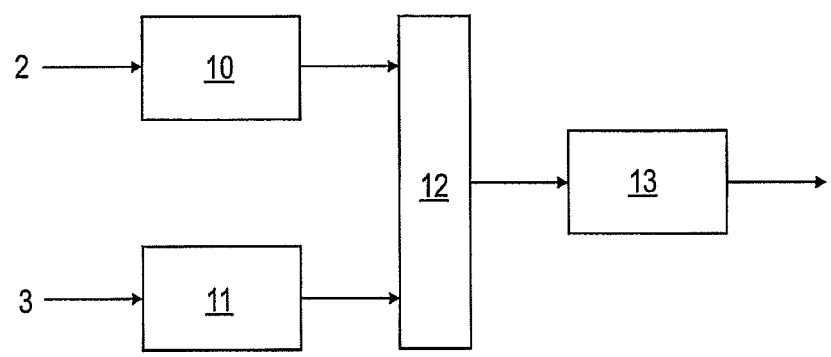
FIG. 4 shows a block diagram illustrating the processing in a base station transmitter according to the present invention in a downlink situation.

FIG. 4 shows processing steps to be performed in a base station transmitter. Processing steps 10 and 11 perform coding and modulation steps to be performed on the data streams 2, 3 before combining them to one single data stream in a subsequent combining step 12. In step 13 coding and modulation steps are performed on the combined signal. For example, the combined signal is modulated to a set of radio resources, such that at least information from two data streams is modulated to the same radio resource.

For the example of hierarchical modulation in FIG. 2 using two levels of QPSK modulation, in steps 10 and 11 of FIG. 4 coding for the two data streams 2, 3, mapping to QPSK constellation points and weighting with different gain factors is performed to achieve the different power levels for the QPSK constellations. In step 12 the signals resulting from steps 10 and 11 are added and in step 13 the sum signal is modulated to a common set of radio resources like subcarriers, CDMA codes or time slots, in such a way that radio resources are modulated with a signal containing more than one data stream.

Figure 5:
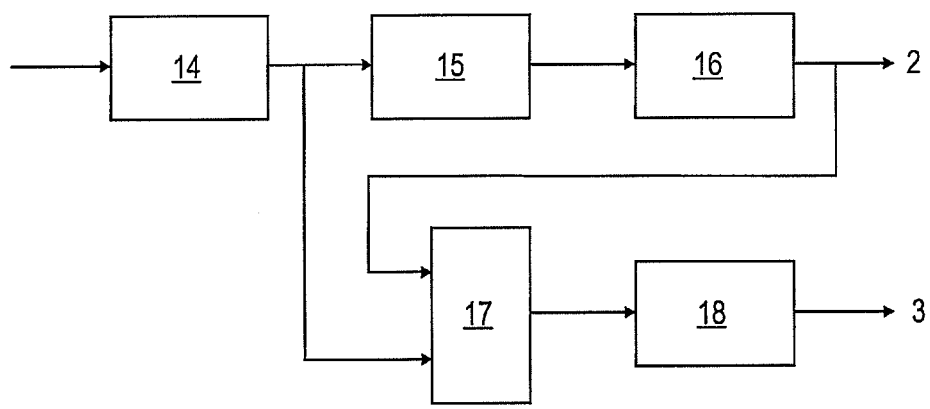
FIG. 5 shows a block diagram illustrating the processing in a mobile terminal receiver according to the present invention in a downlink situation.

FIG. 5 shows the corresponding steps performed in a mobile terminal receiver by appropriate means to demodulate, decode and separate two data streams. In step 14 the signal including the combined data stream is received and an appropriate means performs demodulation and/or decoding steps to be performed on the combined signal. In step 15 a further means separates one of the data streams 2, 3 from the combined signal. Subsequently, in step 16 a further means performs additional decoding and/or demodulation steps for the first extracted data stream 2. In step 17 the second data stream 3 is separated from the combined signal using the demodulated and/or decoded information from the first extracted data stream 2. To perform this separation, said information may be coded and/or modulated again resulting in a coded and/or modulated signal containing only the first data stream 2. Then this signal can e.g. be subtracted from the combined signal generated by step 14.

For the example of FIG. 2 the combined signal is demodulated in step 14. That is, the signal is converted from the RF domain to the base band. The resulting base band signal has the constellation shown in FIG. 2. In this example the two data streams are already separated by different power levels, and no additional explicit steps are required to separate the first data stream 2 with the higher power level, since the receiver of the first data stream 2 can consider the signal components related to the second data stream 3 as noise. That is, considering FIG. 2 and FIG. 5 in combination, in step 16 the QPSK signal with the higher power level is demodulated considering the QPSK signal with the lower power level as noise. In step 17 the first extracted data stream 2 is modulated again on a QPSK constellation with high power and the resulting signal is subtracted from the modulated signal containing both data streams 2, 3. The difference signal with low power contains only the second data stream 3. Finally, in step 18 of FIG. 5 an appropriate means demodulates and decodes the second data stream 3.

Figure 6:
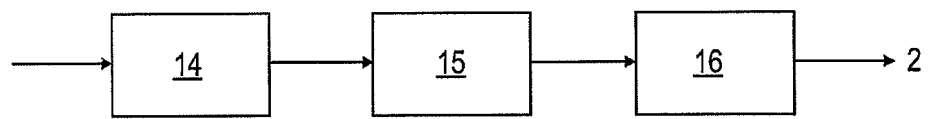
FIG. 6 shows a block diagram illustrating a simplified processing in the receiver according to FIG. 5.

FIG. 6 shows a simplified receiver structure of the receiver of the example in FIG. 5 for the case when only the data stream with the most robust modulation and coding method is to be extracted. The steps 14 to 16 shown in FIG. 6 are carried out by appropriate means in the mobile terminal receiver to demodulate and decode the data stream 2 with the most robust coding and modulation method.

As opposed to conventional multi-user receivers that separate useful signals from interference that occurs because different radio resources like subcarriers at different frequencies or base signals approximately limited to a certain time slot are not perfectly orthogonal, the receiver according to the present invention decodes at least two data streams intentionally modulated on the same radio resources using different modulation, coding or power levels.

In a further case (not shown) a base station is sending two independent unicast data streams for two different terminals (downlink). In this case one of the receivers can operate according to the simplified structure shown in FIG. 6 and only demodulate and decode the first data stream 2. The second receiver operates according the structure shown in FIG. 5, but discards the information from the demodulated and decoded version of the data stream 2, which is not destined for him, after having it used for separation of the second data stream 3.

Figure 7:
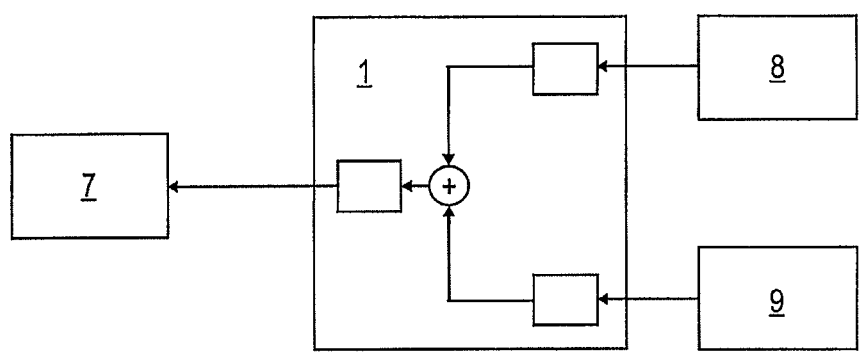
FIG. 7 shows a block diagram illustrating an uplink situation in a wireless access system according to the present invention.

FIG. 7 shows a case in which two mobile terminals 8, 9 in a wireless access system are sending independently information to a base station 7 using a multi-access channel 1 and the same radio resources. In this case the distributed multi-access channel 1 corresponds to one common set of radio resources. The signals may travel through different channel sections, are added at some point and may also travel through a common channel section. The base station 7 receives the sum signal. The signals can be vector valued, e.g. each component corresponding to an antenna element. In any case each terminal contains a transmitter to code and modulate the respective data stream.

Figure 8:
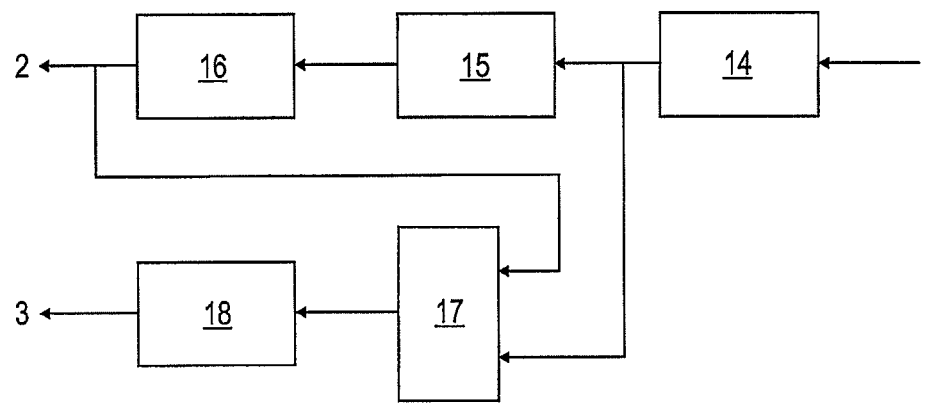
FIG. 8 shows a block diagram illustrating the processing in a base station receiver according to the present invention in an uplink situation.

FIG. 8 shows processing steps performed by appropriate means in the base station receiver to demodulate, decode and separate two data streams 2, 3 from different mobile terminals 8, 9 using the same radio resource. In a first step 14 the signal containing both data streams 2, 3 is demodulated. That is, the signal from the RF frequency corresponding to the used carrier/subcarriers is converted to the base band and, if required, additional demodulation/decoding steps are performed on the sum signal. Following thereto the first data stream is separated in step 15 from the combined signal. In step 16 the first data stream 2 is decoded and/or demodulated. The demodulated/decoded information of the first data stream 2 is used in step 17 to separate the second data stream 3 from the combined signal. Finally, the second data stream 3 is decoded and/or demodulated in step 18.

Further improvements in system performance can be achieved by cooperative encoding and/or modulation in the terminal transmitters. The terminals encode the user information, map information bits to constellation points and choose power levels in such a way that the combined signal after summation in the channel approximately achieves information theoretical capacity corresponding to the commonly used radio resources at the base station receiver. This cooperative encoding/modulation at the terminal transmitters is for example coordinated by the base station or another network instance, which exchanges messages with the terminals for this purpose.

REFERENCE SIGNS 1 multi-user channel
2 first data stream
3 second data stream
4 third data stream
5 QPSK constellation with low power
6 QPSK constellation with higher power
7 base station
8 first terminal
9 second terminal
10 processing step
11 processing step
12 combining step
13 modulation step
14 demodulation/decoding step
15 separation step
16 demodulation/decoding step
17 modulation step
18 demodulation step

The invention claimed is:

1. A method for transmission in a wireless access system, comprising:
    transmitting a first data stream from a base station to a first user terminal in a frequency band and a time slot of a multi-user channel at a power level using a modulation and a coding; and
    transmitting a second data stream from the base station to a plurality of user terminals in the multi-user channel, wherein the second data stream is transmitted in the same frequency band and time slot as the first data stream, wherein the second data stream is transmitted with at least one of the power level, modulation, and coding being different from the power level, modulation, and coding for the first data stream;
    wherein the different power level, modulation, and/or coding facilitate separation of said first data stream from the combined first and second data streams by the first user terminal;
    wherein the first data stream includes unicast information for the first user terminal and the second data stream includes broadcast or multi-cast information for the plurality of user terminals, the broadcast or multi-cast information and the unicast information forming a complete information.

2. The method according to claim 1, wherein the first and second data streams are combined within the base station prior to the transmitting.

3. The method according to claim 1, wherein hierarchical modulation and/or coding in the physical layer is used for the first and second data streams such that the second data stream is transmitted with different modulation and/or coding from the modulation and coding for the first data stream.

4. The method according to claim 1, wherein the first and second data streams are cooperatively modulated and/or coded.

5. The method according to claim 1, wherein the transmit powers for the first and second data streams are coordinated by the base station.

6. The method according to claim 1 wherein the second data stream is transmitted with a different power level and a different modulation from the power level and modulation for the first data stream.

7. The method according to claim 1 wherein the second data stream is transmitted with a different power level and a different coding from the power level and coding for the first data stream.

8. The method according to claim 1 wherein the second data stream is transmitted with a different modulation and a different coding from the modulation and coding for the first data stream.

9. The method according to claim 1 wherein the second data stream is transmitted with a different power level, a different modulation, and a different coding from the power level, modulation, and coding for the first data stream.

10. The method according to claim 1 wherein the second data stream includes multi-cast information.

11. A method for assigning a radio resource to multiple user terminals, comprising:
assigning radio resources in a multi-user channel and signal parameters for transmission of a first data stream from a base station to a first user terminal;
assigning radio resources in the multi-user channel and signal parameters for transmission of a second data stream from the base station to plurality of user terminals, wherein the radio resources include a frequency band and a time slot, wherein the frequency band and time slot assigned for transmission of the second data stream are the same as the frequency band and time slot assigned for transmission of the first data stream, wherein the signal parameters include a power level, a modulation, and a coding, wherein at least one of the power level, modulation, and coding assigned for transmission of the second data stream are different from the power level, modulation, and coding assigned for transmission of the first data stream;
wherein the different power level, modulation, and/or coding facilitate separation of said first data stream from the combined first and second data streams; by the first user terminal;
wherein the first data stream includes first unicast information for the first user terminal and the second data stream includes broadcast or multi-cast information for the plurality of user terminals, the broadcast or multi-cast information and the unicast information forming a complete information.

12. The method according to claim 11, further comprising:
defining signal parameters associated with the assigning and transmitting depending on distance of the user terminals from the base station and/or channel characteristics of multi-user channels between the base station and the user terminal, wherein the channel characteristics are based on either instantaneous or average characteristics.

13. The method according to claim 11 wherein the power level and modulation assigned for transmission of the second data stream are different the power level and modulation assigned for transmission of the first data stream.

14. The method according to claim 11 wherein the power level and coding assigned for transmission of the second data stream are different the power level and coding assigned for transmission of the first data stream.

15. The method according to claim 11 wherein the modulation and coding assigned for transmission of the second data stream are different the modulation and coding assigned for transmission of the first data stream.

16. The method according to claim 11 wherein the power level, modulation, and coding assigned for transmission of the second data stream are different from the power level, modulation, and coding assigned for transmission of the first data stream.

17. The method according to claim 11 wherein the second data stream includes multi-cast information.

18. The method according to claim 12, wherein the channel characteristics comprise the mean path loss and/or the angular characteristics of the channels between the base station and the terminals.

* * * * *